United States Patent
Okuzawa

(10) Patent No.: US 8,655,874 B2
(45) Date of Patent: Feb. 18, 2014

(54) METHOD AND APPARATUS FOR ACQUIRING AND DISPLAYING IMAGE DATA CORRESPONDING TO CONTENT DATA

(75) Inventor: Nozomu Okuzawa, Tokyo (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 12/834,701

(22) Filed: Jul. 12, 2010

(65) Prior Publication Data

US 2010/0278022 A1 Nov. 4, 2010

Related U.S. Application Data

(63) Continuation of application No. 11/340,631, filed on Jan. 27, 2006.

(30) Foreign Application Priority Data

Feb. 7, 2005 (JP) ................................. 2005-030675

(51) Int. Cl.
*G06F 17/30* (2006.01)
*G06F 7/00* (2006.01)

(52) U.S. Cl.
USPC .......................................... 707/728; 434/307

(58) Field of Classification Search
USPC ........ 700/94; 386/40, 344; 382/173; 345/156; 713/176; 370/358; 707/916; 434/307
See application file for complete search history.

(56) References Cited

U.S. PATENT DOCUMENTS

| | | | |
|---|---|---|---|
| 5,588,842 A | 12/1996 | Nishimura et al. | |
| 6,788,878 B1 * | 9/2004 | Fujii et al. | 386/344 |
| 7,228,188 B1 * | 6/2007 | Aihara et al. | 700/94 |
| 7,379,593 B2 * | 5/2008 | Fan et al. | 382/173 |
| 2002/0159304 A1 | 10/2002 | Morita et al. | |
| 2002/0180697 A1 * | 12/2002 | Freiberger et al. | 345/156 |
| 2003/0068157 A1 | 4/2003 | Kushibe et al. | |
| 2003/0097423 A1 | 5/2003 | Ozawa et al. | |
| 2004/0223245 A1 | 11/2004 | Morohashi | |
| 2006/0120686 A1 * | 6/2006 | Liebenow | 386/40 |
| 2007/0002846 A1 * | 1/2007 | Rada et al. | 370/358 |

FOREIGN PATENT DOCUMENTS

| | | |
|---|---|---|
| EP | 1 067 543 | 1/2001 |
| EP | 1 381 026 | 1/2004 |
| JP | 7-325593 | 12/1995 |
| JP | 2000-298978 A | 10/2000 |
| JP | 2001-356779 | 12/2001 |
| JP | 2004-185788 | 7/2004 |

* cited by examiner

*Primary Examiner* — Sathyanarayan Pannala
(74) *Attorney, Agent, or Firm* — Oblon, Spivak, McClelland, Maier & Neustadt, L.L.P.

(57) ABSTRACT

An information reproducing apparatus and method thereof. The information reproducing apparatus includes a storage unit, communication unit, controller, and display unit. The storage unit stores music data and at least one first string of characters corresponding to the music data. The reproducing unit reproduces the music data from the storage unit. The communication unit communicates with an image data storage unit, which stores a plurality of image data each corresponding to at least one second string of characters. The controller controls acquisition of one image data from the image data storage unit via the communication unit. The one image data is acquired based on a comparison between the at least one first string of characters and the plurality of the at least one second string of characters. Further, the display unit is configured to display the acquired image data when the reproducing unit is reproducing the music data.

14 Claims, 11 Drawing Sheets

FIG. 3
| | TYPE OF GENRE | COMPARISON ORDER | COMPARISON CHARACTER STRING | DISPLAY IMAGE |
|---|---|---|---|---|
| 1 | Punk | 1 | punk |  D1 |
| 2 | Metal | 2 | metal |  D2 |
| ... | ... | ... | ... | ... |
| N | Unclassifiable | N | *unknown |  DN |
TB1
* Unknown if inapplicable to comparison character string (including space)

FIG. 5

| FILE NO. | | 1 |
|---|---|---|
| TRACK INFO | CONTENT ID | 00000001 |
| | TITLE | TITLE |
| | ARTIST | ARTIST NAME |
| | GENRE | GENRE NAME |
| | JACKET | JACKET IMAGE |
| | ... | ... |
| ALBUM INFO | ALBUM ID | 00000001 |
| | TITLE | TITLE |
| | ARTIST | ARTIST NAME |
| | TRACK ORDER | 1 |
| | GENRE | GENRE NAME |
| | JACKET | JACKET IMAGE |
| | ... | ... |
| DATA INFO | CODEC | ATRAC3 |
| | BITRATE | 132KBPS |
| | CHANNEL | 2 |
| | ... | ... |
| | ... | ... |

FIG. 7

| | TYPE OF ARTIST | COMPARISON CHARACTER STRING | DISPLAY IMAGE |
|---|---|---|---|
| 1 | Dekoboko Sayaka | dekoboko sayaka | Dx1 |
| 2 | Toba Outotsu | toba outotsu | Dx2 |
| ... | ... | ... | ... |
| N | Unknown | — | DxN |

TB2

METHOD AND APPARATUS FOR ACQUIRING AND DISPLAYING IMAGE DATA CORRESPONDING TO CONTENT DATA

CROSS REFERENCES TO RELATED APPLICATIONS

This application is a continuation of U.S. Ser. No. 11/340,631 filed Jan. 27, 2006, which claims priority under 35 U.S.C. 119 to Japanese Patent Application 2005-030675 filed Feb. 7, 2005, the entire contents of both of which are incorporated herein by reference.

BACKGROUND OF THE INVENTION

The present invention relates to a recording/reproducing apparatus and a method and a program thereof and, more particularly, to a recording/reproducing apparatus and a method and a program thereof that are suitably applicable to a reproducing apparatus for reproducing externally obtained music data for example.

Recently, reproducing apparatuses of this type are adapted to get music data from servers providing music data through the Internet.

The music data thus obtained through the Internet generally includes symbol images visually representing impressions of that music data for example. A symbol image in this case is a symbol image of the jacket of a particular CD (Compact Disc) to which that music data is recorded, for example.

If an operation for reproducing music data obtained through the Internet is executed for example, such a reproducing apparatus as mentioned above may display, on a display monitor thereof, a jacket image for example related to a title of music data specified by that reproducing operation or to the music data itself, thereby letting a user recognize an image and various kinds of information of the music data to be reproduced at that time (refer to Japanese Patent Laid-Open No. 2001-175624, corresponding U.S. Patent Application No. 2002-159304).

SUMMARY OF THE INVENTION

The above-mentioned reproducing apparatus having the configuration described above is adapted to get music data also from each CD to which music data is recorded. However, the music data thus obtained from each CD is generally not related with a jacket image of that music data.

Consequently, when an operation is executed for reproducing music data from a CD, the above-mentioned reproducing apparatus can hardly display the jacket image corresponding to the music data specified by that reproducing operation, thereby making it difficult for the user to visually recognize the impression of that music data.

Therefore, present invention addresses the above-identified and other problems associated with related-art methods and apparatuses by providing a recording/reproducing apparatus, a method thereof, and a program thereof.

In carrying out the invention and according to one aspect thereof, there is provided a recording/reproducing apparatus having a recording device configured to record content data to a storage medium and a reproduction device configured to reproduce the content data from the storage medium. The recording/reproducing apparatus further includes an image data storage device, an attribute information detector, and a controller. The image data storage device is configured to store image data corresponding to each of a plurality of pieces of attribute information. The attribute information detector is configured to detect, if no image data is related with the content data, attribute information related with the content data; an image data detector configured to detect image data corresponding the attribute information detected by the attribute information detector from the image data storage device. Further, the controller is configured to control such that the image data detected by the image data detector is outputted at least during reproduction of the content data by the reproduction device.

The above-mentioned novel configuration allows the outputting of image data corresponding to the information attribute of content data if the content data is related with no image data.

As described and according to the invention, if no image data is related with content data, image data corresponding to the attribute information of that content data may be outputted. Consequently, symbol images associated with content data may be surely displayed.

BRIEF DESCRIPTION OF THE DRAWINGS

FIG. 3 is a diagram for describing a main genre vs. symbol image table;

FIG. 5 is a diagram for describing attribute information related with music data;

FIG. 7 is a diagram for describing an artist vs. symbol image table;

DETAILED DESCRIPTION OF THE PREFERRED EMBODIMENTS

This invention will be described in further detail by way of embodiments thereof with reference to the accompanying drawings.

(1) First Embodiment

Figure 1:
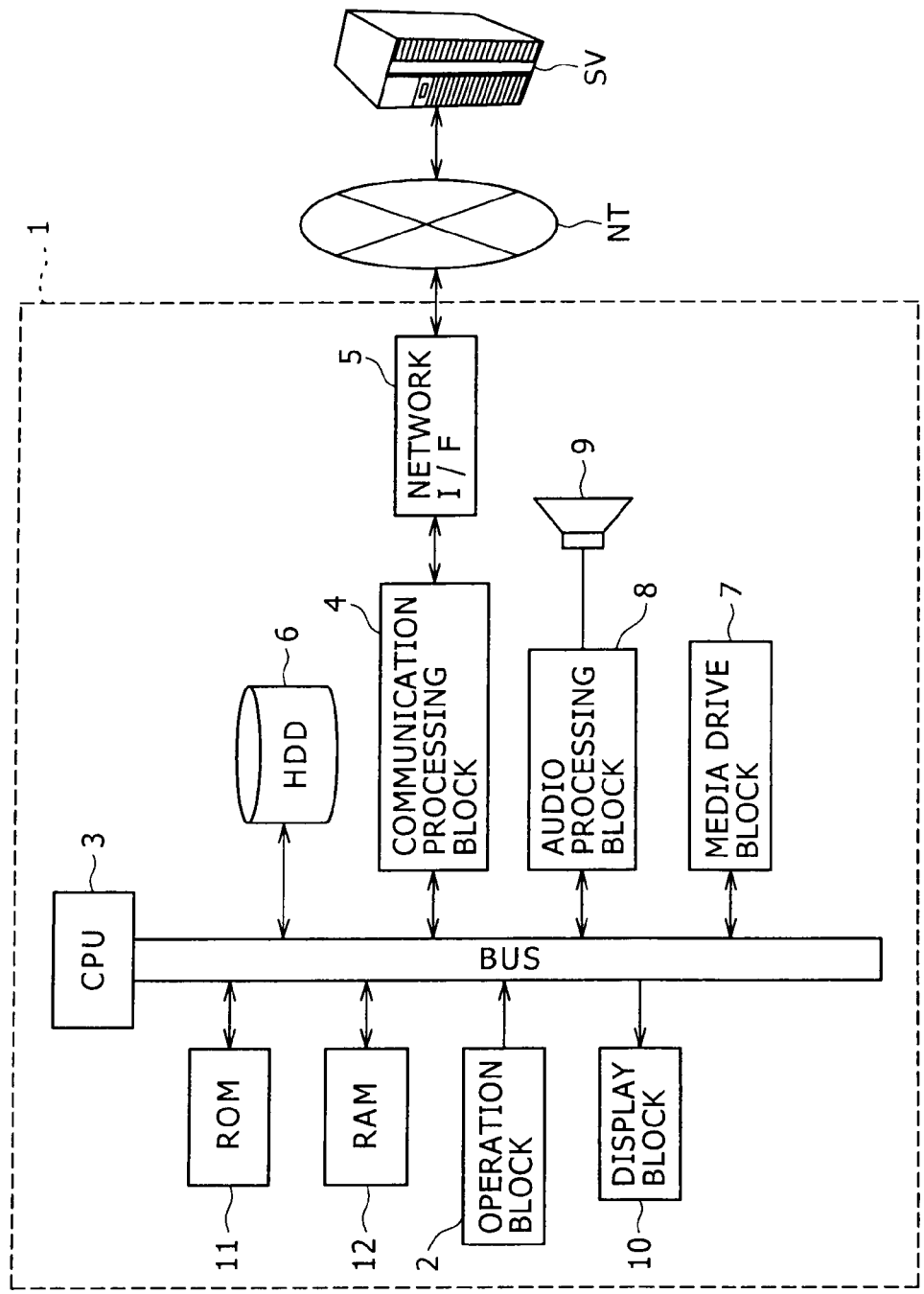
FIG. 1 is a block diagram illustrating an exemplary circuit configuration of a reproducing apparatus practiced as one embodiment of the invention.

Referring to FIG. 1, reference number 1 denotes a reproducing apparatus as a whole. If a user thereof executes music data acquisition operation through an operation block 2 for acquiring music data from a music provision server SV for providing music data for example, a CPU (Central Processing Unit) 3 that controls the reproducing apparatus 1 in its entirety transmits accordingly a music data request signal for requesting the music data corresponding to that music data acquisition operation to a music provision server SV via a communication processing block 4, a network interface 5, and the Internet NT sequentially. Receiving the music data request signal, the music provision server SV transmits the music data requested by the music data request signal to the reproducing apparatus 1 via the Internet NT. The reproducing apparatus 1 receives, through the network interface 5 and the communication processing block 4 in this order, the music data from the music provision server SV, storing the received music data into a hard disc drive 6. Thus, the reproducing apparatus 1 is able to get music data from the music provision server SV. Likewise, the reproducing apparatus 1 is also able to get a plurality of pieces of music data bundled in one group as one album work from the music provision server SV. An album work herein denotes a unit in which music is sold as one piece of CD (Compact Disc), for example.

When an operation for acquiring music data from a CD is executed on the operation block 2 of the reproducing apparatus 1, the CPU 3 of the reproducing apparatus 1 accordingly controls a media drive block 7 on which the CD is loaded to read the music data therefrom and stores the retrieved music data into the hard disc drive 6. Thus, the reproducing apparatus 1 is able to get music data from a CD.

The music data thus acquired from a music provision server SV or a CD is related with attribute information for each piece of music. This music data attribute information may include symbol image data visually representing an impression associated with that music data (in this case, jacket image data equivalent to a CD jacket image) and a genre name indicative of a field to which that music image belongs.

The attribute information for each piece of music, music data title, album name, artist name, lyrics, and genre for example, may be manually entered by the user through the operation block 2. Also, it is practicable that, when a CD is reproduced through the media drive block 7, for example, identification information generated on the basis of reproduced TOC and music data be transferred to an external server under the control of the CPU 3, the attribute information corresponding to that identification information be received from that external server through the network interface 5 and the communication processing block 4, the received attribute information being recorded to the hard disc drive 6 as related with that music data along therewith read from that CD. The external server may be a CDDB (trademark) of Gracenote, Inc. for example.

Figure 2:
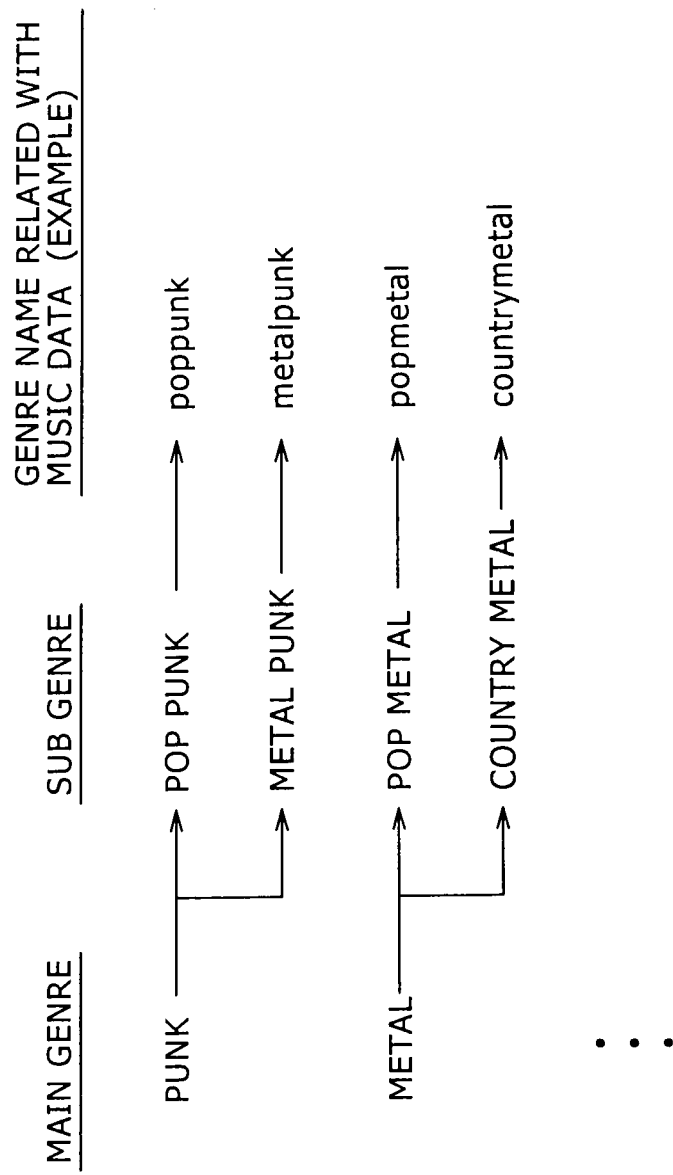
FIG. 2 is a diagram for describing genres defined in the above-mentioned embodiment.

The present embodiment defines main genres indicative of major classifications and sub genres indicative of specific genres below the main genres as shown in FIG. 2 for example. In the example shown in FIG. 2, main genres are "punk," "metal," and so on. Main genre "punk" has sub genres "pop punk" and "metal punk." Main genre "metal" has sub genres "pop metal" and "country metal." Therefore, if the acquired music data belongs to sub genre "pop punk" of main genre "punk," the attribute information of that music data indicates character string "poppunk" for example indicative of sub genre "pop punk" as a genre name. It should be noted that the character string indicated in this attribute information as a genre name is editable by the user, so that the character string may be other than "poppunk."

If an operation for reproducing acquired music data is executed through the operation block 2 of the reproducing apparatus 1, the CPU 3 of the reproducing apparatus 1 accordingly reads music data corresponding to the reproduction operation done from the hard disc drive 6 to reproduce the music data, thereby supplying a resultant audio signal to an audio processing block 8. Consequently, the audio processing block 8 sounds the supplied audio signal through a speaker 9. Thus, the reproducing apparatus 1 is able to reproduce acquired music data.

At the same time, the CPU 3 of the reproducing apparatus 1 reads the attribute information related with the currently reproduced music data (hereafter referred to as in-reproduction music data) from the hard disc drive 6 to determine whether the attribute information includes jacket image data.

If jacket image data is found included in the attribute information, then the CPU 3 of the reproducing apparatus 1 displays a jacket image on a display block 10 on the basis of that jacket image data. Then, visually recognizing the jacket image displayed on the display block 10, the user is able to visually recognize the impression of the in-reproduction music data being reproduced at that moment.

On the other hand, if no jacket image data is found included in the attribute information, the CPU 3 of the reproducing apparatus 1 determines whether the attribute information includes a genre name.

If a genre name, "poppunk" for example, is found included in the attribute information, then the CPU 3 of the reproducing apparatus 1 recognizes, from this genre name "poppunk," main genre "punk" to which in-reproduction music data belongs and executes alternate symbol image display processing for displaying a symbol image corresponding to recognized main genre "punk."

In this alternate symbol image display processing, main genre vs. symbol image table TB1 (FIG. 3) stored in the hard disc drive 6 for example is used.

In the case of the present embodiment, this main genre vs. symbol image table TB1 shows "punk," "metal," and so on as main genres. In this main genre vs. symbol image table TB1, symbol image data D (1, 2, . . . , N) symbolizing main genres "punk," "metal," and so on are related with main genres "punk," "metal," and so on.

In addition, this main genre vs. symbol image table TB1 relates a comparison character string with each main genre. For this comparison character string, a character string is selected which is high in the possibility in which the character sting appears in the genre name in the attribute information of the music data belonging to that genre name. For example, "punk" is selected for the comparison character string corresponding to main genre "punk." This is because character strings "poppunk" and "metalpunk" for example are often set as genre names in the attribute information of the music data belonging to main genre "punk," making it high possible that character string "punk" appears in the genre name in the attribute information of the music data belonging to main genre "punk."

Consequently, the CPU 3 of the reproducing apparatus 1 compares genre name "poppunk" indicated in the attribute information of in-reproduction music data with comparison character string "punk" for example in main genre vs. symbol image table TB1. If the CPU 3 recognizes that this comparison character string "punk" is found included in genre name "poppunk," the CPU 3 recognizes main genre "punk" corresponding to this comparison character string "punk" as the main genre of the in-reproduction music data. Then, the CPU 3 of the reproducing apparatus 1 reads symbol image data D1 corresponding to the recognized main genre "punk" from the main genre vs. symbol image table TB1 and displays a symbol image on the display block 10 on the basis of the read symbol image data.

Thus, if jacket image data is not related with the in-reproduction music data being reproduced at that moment, the CPU 3 of the reproducing apparatus 1 is able to display a symbol image symbolizing the main genre to which this in-reproduction music data belongs instead of displaying a jacket image. As a result, the reproducing apparatus 1 may be realized that is surely able to display symbol images associated with in-reproduction music data being reproducing at that time.

In the case of the present embodiment, main genre vs. symbol image table TB1 shows, for each comparison character sting, a comparison sequence in the comparison between genre names in the attribute information of in-reproduction music data and comparison character strings. In the present embodiment for example, comparison character string "punk" corresponding to main genre "punk" may be assumed if determined with reference to FIG. 2 for example that the frequency of inclusion in genre names ("popmetal," "countrymetal," etc.) of other main genres "metal" and so on than this main genre "punk" be low, so that the comparison sequence is set to "1" for prioritized comparison. On the other hand, comparison sequence "metal" may be assumed if determined with reference to FIG. 2 for example that the frequency of inclusion in genre names ("poppunk," "'metal' punk," etc.) of other main genres "punk" and so on than this main genre "metal" be high, so that the comparison sequence is set to "2" for lower comparison priority.

Thus, on the basis of a comparison sequence shown in main genre vs. symbol image table TB1, the CPU 3 of the reproducing apparatus 1 compares a genre name in the attribute information of in-reproduction music data preferentially with comparison character strings assumed to have a smaller frequency of inclusion in the genre names of other main genres among a plurality of comparison character strings shown in main genre vs. symbol image table TB1. Consequently, the reproducing apparatus 1 starts comparison with a comparison character string small in the possibility of inclusion in the genre names of other main genres (in this case, "punk"). This allows more accurate recognition of the main genre of that in-reproduction music data from among the genre names of the attribute information of that in-reproduction music data.

Figure 4:
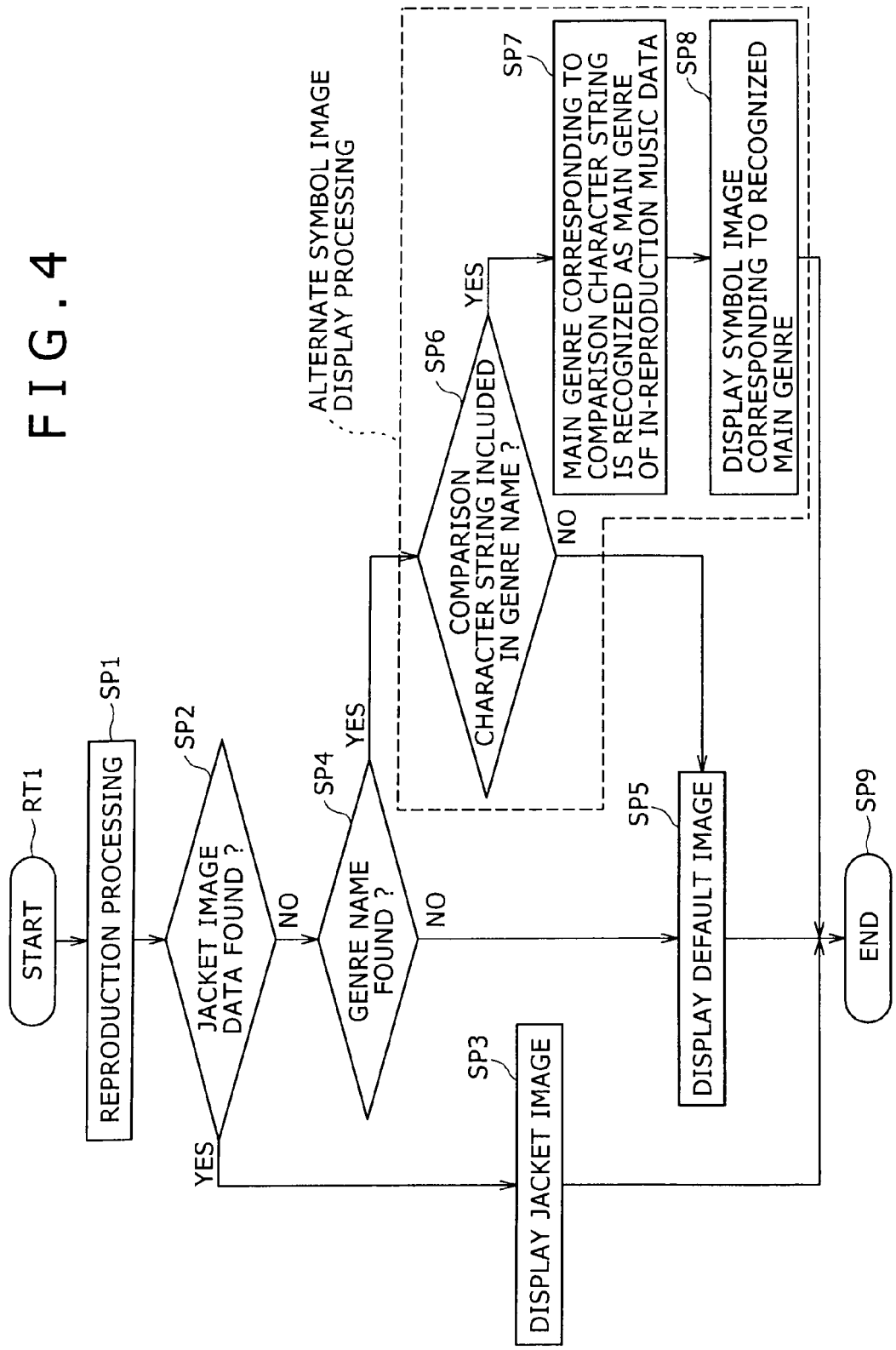
FIG. 4 is a flowchart indicative of an image display processing procedure.

The following describes image display processing procedure RT1 of the first embodiment with reference to the flowchart shown in FIG. 4.

When an operation for reproducing acquired music data is executed through the operation block 2 of the reproducing apparatus 1, the CPU 3 of the reproducing apparatus 1 accordingly goes to step SP1 to read the music data corresponding to the reproduction operation from the hard disc drive 6, thereby starting reproduction processing.

Next, the CPU 3 of the reproducing apparatus 1 goes to step SP2 to read the attribute information related with the in-reproduction music data being reproduced from the hard disc drive 6, determining whether jacket image data is included in the read attribute information.

If the decision in step SP2 is YES, it indicates that jacket image data is included in the attribute information of the in-reproduction music data, upon which the CPU 3 of the reproducing apparatus 1 goes to step SP3. In step SP3, the CPU 3 of the reproducing apparatus 1 displays a jacket image on the display block 10 on the basis of the jacket image data included in the attribute information of the in-reproduction music data and then goes to step SP9 to end image display processing procedure RT1.

On the other hand, if the decision in step SP2 is NO, it indicates that jacket image data is not included in the attribute information of the in-reproduction music data, upon which the CPU 3 of the reproducing apparatus 1 goes to step SP4. In step SP4, the CPU 3 of the reproducing apparatus 1 determines whether a genre name is included in the attribute information of the in-reproduction music data.

If the decision is NO in step SP4, it indicates that a genre name is not included in the attribute information of the in-reproduction music data, upon which the CPU 3 of the reproducing apparatus 1 goes to step SP5. In step SP5, the CPU 3 of the reproducing apparatus 1 displays a default image on the display block 10 on the basis of predetermined default image data DN defined in main genre vs. symbol image table TB1 shown in FIG. 3 and then goes to step SP9 to end image display processing procedure RT1.

On the other hand, if the decision is YES in step SP4, it indicates that "popmetal" for example is included as a genre name in the attribute information of the in-reproduction music data, upon which the CPU 3 of the reproducing apparatus 1 goes to step SP6.

In step SP6, the CPU 3 of the reproducing apparatus 1 sequentially compares each of comparison character strings "punk," "metal," and so on with genre name "popmetal" in the attribute information of the in-reproduction music data in accordance with the comparison sequence shown in main genre vs. symbol image table TB1. If the CPU 3 of the reproducing apparatus 1 consequently finds comparison character string "metal" compared second for example in the genre name "popmetal," then the CPU 3 of the reproducing apparatus 1 goes to step SP7 to recognize main genre "metal" corresponding to this comparison character string "metal" as the main genre of the in-reproduction music data.

Next, the CPU 3 of the reproducing apparatus 1 goes to step SP8 to read, from the hard disc drive 6, symbol image data D2 corresponding to main genre "metal" recognized in step SP7 and displays a symbol image on the display block 10 on the basis of this symbol image data D2, upon which the CPU 3 of the reproducing apparatus 1 goes to step SP9 to end image display processing procedure RT1.

It should be noted that, if, in step SP6, none of character strings "punk," "metal" and so on is found included in this genre name after sequentially comparing comparison character strings "punk," "metal" and so on shown in main genre vs. symbol image table TB1 with the genre name in the attribute information of the in-reproduction music data, then the CPU 3 of the reproducing apparatus 1 goes to step SP5. In step SP5, the CPU 3 of the reproducing apparatus 1 displays a default image on the display block 10 on the basis of default image data DN and then goes to step SP9 to end image display processing procedure RT1.

As described above, if jacket image data indicative of the symbol of the in-reproduction music data being reproduced at that moment is not related therewith, the reproducing apparatus 1 recognizes the main genre of that in-reproduction music data on the basis of the genre name information related with that in-reproduction music data, reads the symbol image data symbolizing the recognized main genre from main genre vs. symbol image table TB1, and displays the symbol image on the basis of the read symbol image data. Consequently, the reproducing apparatus 1 is able to surely display the symbol image associated with the in-reproduction music data being reproduced at that moment.

(2) Second Embodiment

A second embodiment of the invention is different from the above-mentioned first embodiment in the contents of attribute information related with music data acquired from music provision server SV or a CD. On the other hand, the second embodiment is substantially the same as the first embodiment in the configuration (FIG. 1) of the reproducing apparatus 1, the genre definition (FIG. 2), and main genre vs. symbol image table TB1 (FIG. 3). Therefore, the following describes the contents of the attribute information related with music data with reference to FIG. 5.

To be more specific, the attribute information of music data is configured by track information ("TRACK INFO" in the figure) indicative of information about the music data itself, album information ("ALBUM INFO" in the figure) indicative of information about an album to which the music data belongs, and data information ("DATA INFO" in the figure) indicative of information about compression algorithm for example used for the music data. The track information in this attribute information may include jacket image data (hereafter referred to as track jacket image data) indicative of a symbol of that music data, a genre name (hereafter referred to as a track genre name) indicative of a genre to which that music data belongs, and an artist name (hereafter referred to as a track artist name) indicative of a player or an editor of that music data, for example. The album information in this attribute information may include a jacket image (hereafter referred to as album jacket image data) indicative of a symbol of a particular album to which that music data belongs and a genre name (hereafter referred to as an album genre name) indicative of a genre to which that album belongs, and an artist name (hereafter referred to as an album artist name) indicative of a creator or an editor of that album, for example.

Figure 6:
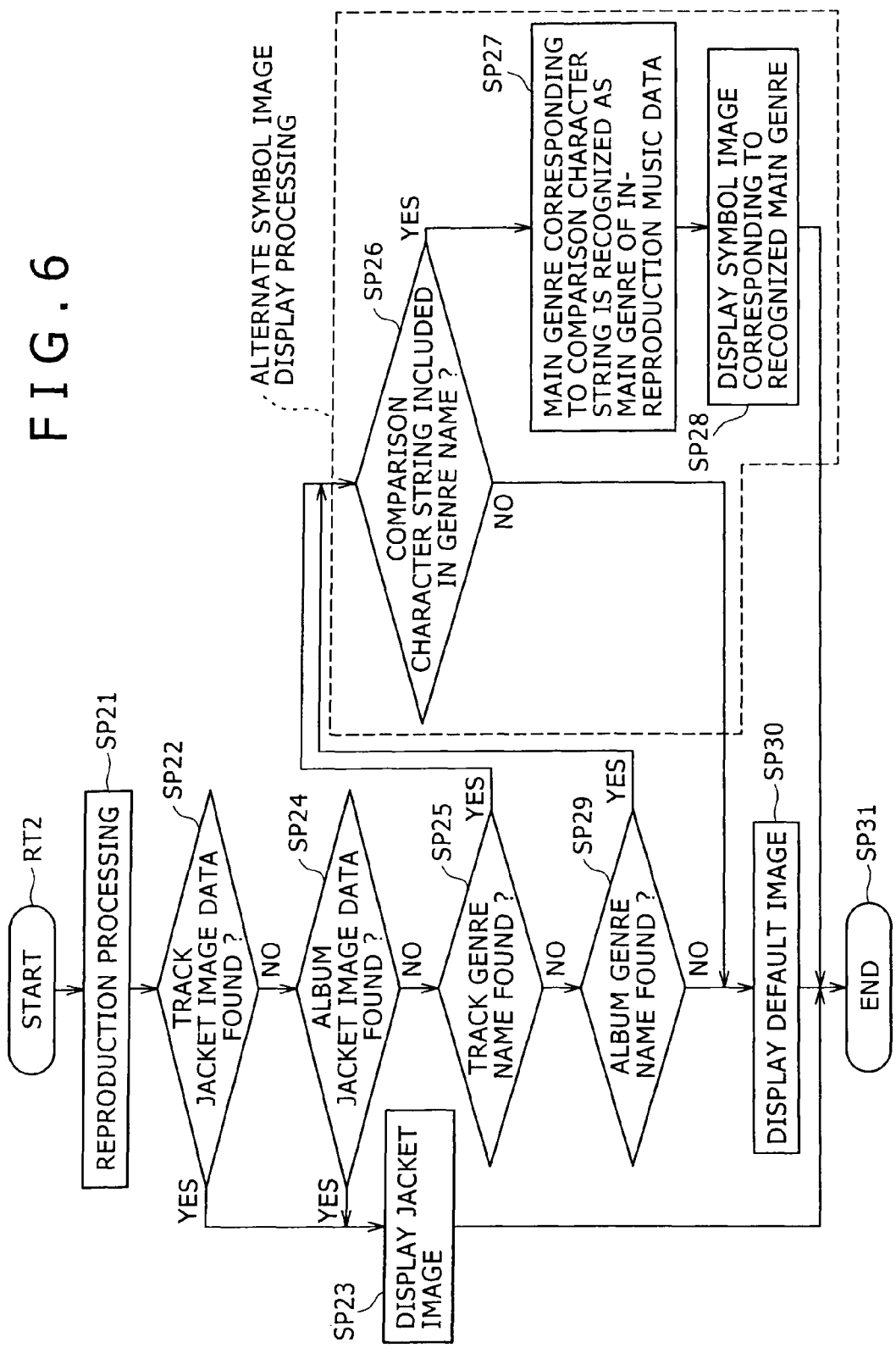
FIG. 6 is a flowchart indicative of an image display processing procedure.

The following describes image display processing procedure RT2 (FIG. 6) in the second embodiment.

When an operation for reproducing acquired music data is executed through the operation block 2 of the reproducing apparatus 1, the CPU 3 of the reproducing apparatus 1 accordingly goes to step SP21 to read the music data corresponding to the reproduction operation from the hard disc drive 6, thereby starting reproduction processing.

Next, the CPU 3 of the reproducing apparatus 1 goes to step SP22 to read attribute information related with in-reproduction music data being reproduced from the hard disc drive 6, thereby determining whether track jacket image data is included in the read attribute information.

If the decision is YES in step SP22, it indicates that track jacket image data is included in the attribute information of in-reproduction music data, upon which the CPU 3 of the reproducing apparatus 1 goes to step SP23. In step SP23, the CPU 3 of the reproducing apparatus 1 displays a track jacket image on the display block 10 on the basis of the track jacket image data included in the attribute information of the in-reproduction music data and then goes to step SP31 to end image display processing procedure RT2. On the other hand, if the decision in step SP22 is NO, it indicates that the track jacket image data is not included in the attribute information of the in-reproduction music data, upon which the CPU 3 of the reproducing apparatus 1 goes to step SP24.

In step SP24, the CPU 3 of the reproducing apparatus 1 determines whether album jacket image data is included in the attribute information related with the in-reproduction music data.

If the decision is YES in step SP24, it indicates that album jacket image data is included in the attribute information of the in-reproduction music data, upon which the CPU 3 of the reproducing apparatus 1 goes to step SP23. In step SP23, the CPU 3 of the reproducing apparatus 1 displays an album jacket image on the display block 10 on the basis of the album jacket image data included in the attribute information of the in-reproduction music data and then goes to step SP31 to end image display processing procedure RT2. On the other hand, if the decision is NO in step SP24, it indicates that album jacket image data is not included in the attribute information of the in-reproduction music data, upon which the CPU 3 of the reproducing apparatus 1 goes to step SP25.

In step SP25, the CPU 3 of the reproducing apparatus 1 determines whether a track genre name is included in the attribute information of the in-reproduction music data.

If the decision is YES in step SP25, it indicates that "popmetal" for example is included in the attribute information of the in-reproduction music data as a track genre name, upon which the CPU 3 of the reproducing apparatus 1 goes to step S26. In step SP26, the CPU 3 of the reproducing apparatus 1 sequentially compares comparison character strings "punk," "metal," and so on with track genre name "popmetal" in the attribute information of the in-reproduction music data in accordance with a comparison sequence indicated in main genre vs. symbol image table TB1. If comparison character string "metal" compared second is found included in track genre name "popmetal," then the CPU 3 of the reproducing apparatus 1 goes to step SP27 to recognize that main genre "metal" corresponding to this comparison character string "metal" as the main genre of the in-reproduction music data. Next, the CPU 3 of the reproducing apparatus 1 goes to step SP28 to display a symbol image on the display block 10 on the basis of symbol image data D2 corresponding to main genre "metal" recognized in step SP27 and then goes to step SP31 to end image display processing procedure RT2. It should be noted that, if, in step SP26, none of character strings "punk," "metal" and so on is found included in this genre name after sequentially comparing comparison character strings "punk," "metal" and so on shown in main genre vs. symbol image table TB1 with the track genre name in the attribute information of the in-reproduction music data, then the CPU 3 of the reproducing apparatus 1 goes to step SP30. In step SP30, the CPU 3 of the reproducing apparatus 1 displays a default image on the display block 10 on the basis of default image data DN and then goes to step SP31 to end image display processing procedure RT2.

On the other hand, if the decision is NO in step S25, it indicates that a track genre name is not included in the attribute information of the in-reproduction music data, upon which the CPU 3 of the reproducing apparatus 1 goes to step SP29.

In step S29, the CPU 3 of the reproducing apparatus 1 determines whether an album genre name is included in the attribute information of the in-reproduction music data.

If the decision in YES in step SP29, it indicates that "countrymetal" for example is included in the attribute information of the in-reproduction music data as an album genre name, upon which the CPU 3 of the reproducing apparatus 1 goes to step SP26. In step SP26, the CPU 3 of the reproducing apparatus 1 sequentially compares comparison character strings "punk," "metal," and so on with album genre name "country metal" in the attribute information of the in-reproduction music data in accordance with a comparison sequence indicated in main genre vs. symbol image table TB1. If comparison character string "metal" compared second for example is found included in album genre name "countrymetal," then the CPU 3 of the reproducing apparatus 1 goes to step SP27 to recognize main genre "metal" corresponding to this comparison character string "metal" as the main genre of the in-reproduction music data. Next, the CPU 3 of the reproducing apparatus 1 goes to step SP28 to display a symbol image on the display block 10 on the basis of symbol image data D2 corresponding to main genre "metal" recognized in step SP27 and then goes to step SP31 to end image display processing procedure RT2. It should be noted that, if, in step SP26, none of character strings "punk," "metal" and so on is found included in this genre name after sequentially comparing comparison character strings "punk," "metal" and so on shown in main genre vs. symbol image table TB1 with the album genre name in the attribute information of the in-reproduction music data, then the CPU 3 of the reproducing apparatus 1 goes to step SP30. In step SP30, the CPU 3 of the reproducing apparatus 1 displays a default image on the display block 10 on the basis of default image data DN and then goes to step SP31 to end image display processing procedure RT2.

On the other hand, if the decision is NO in step S29, it indicates that an album genre name is not included in the attribute information of the in-reproduction music data, upon which the CPU 3 of the reproducing apparatus 1 goes to step SP30 to display a default image on the display block 10 on the basis of default image data DN and then goes to step SP31 to end image display processing procedure RT2.

As described above, if track jacket image data indicative of a symbol of that in-reproduction music data and album jacket image data indicative of a symbol of an album to which that in-reproduction music data belongs are not related with the in-reproduction music data being reproduced at that moment, this reproducing apparatus 1 may recognize the main genre that in-reproduction music data or the main genre of the album to which that in-reproduction music data belongs on the basis of track genre name information or album genre name information related with that in-reproduction music data, read symbol image data symbolizing the recognized main genre from main genre vs. symbol image table TB1, and display the symbol image on the basis of the read symbol image data. Consequently, this reproducing apparatus 1 may surely display the symbol image associated with the in-reproduction music data being reproduced at that moment.

(3) Third Embodiment

A third embodiment of the invention is substantially the same in configuration as the above-mentioned first and second embodiments. On the other hand, the third embodiment uses a table that is different from main genre vs. symbol image table TB1 (FIG. 3). The following mainly describes differences between the third embodiment and the foregoing embodiments.

In this case, the attribute information related with the music data acquired from music provision server SV or a CD may include jacket symbol data of that music data and an artist name indicative of a player or an editor of that music data.

If the artist who played music data is "Dekoboko Sayaka" for example, "Dekoboko Sayaka" for example is displayed as one of artist names included in the attribute information of this music data. It should be noted that each character string indicated as an artist name in the attribute information may be edited by the user for example, so that the character string in this example may be other than "Dekoboko Sayaka." If an artist who played music data is "Toba Outotsu" for example, "Toba Outotsu" for example is displayed as an artist name included in the attribute information of this music data.

When an operation for reproducing acquired music data is executed through the operation block 2 of the reproducing apparatus 1, the CPU 3 of the reproducing apparatus 1 accordingly reads the specified music data from the hard disc drive 6, starting reproduction processing.

At the same time, the CPU 3 of the reproducing apparatus 1 reads the attribute information related with the in-reproduction music data being reproduced from the hard disc drive 6 to determine whether jacket symbol data is included in the read attribute information.

If jacket symbol data is found included in the attribute information, then the CPU 3 of the reproducing apparatus 1 displays a jacket symbol on the display block 10 on the basis of this jacket symbol data. Consequently, by visually recognizing the jacket symbol displayed on the display block 10, the user is able to recognize the symbol of the in-reproduction music data being reproduced at that moment.

On the other hand, if jacket symbol data is found not included in the attribute information, then the CPU 3 of the reproducing apparatus 1 determines whether an artist name is included in this attribute information.

Recognizing that "Dekoboko Sayaka" for example is included in the attribute information as an artist name, the CPU 3 of the reproducing apparatus 1 recognizes artist "Dekoboko Sayaka" of the in-reproduction music data from this artist name "Dekoboko Sayaka" to execute alternate symbol image display processing for displaying the symbol image corresponding to recognized artist "Dekoboko Sayaka."

In this alternate symbol image display processing, artist vs. symbol image table TB2 (FIG. 7) stored in the hard disc drive 6, for example.

In the second embodiment, artist vs. symbol image table TB2 shows "Dekoboko Sayaka," "Toba Outotsu," and so on as artists. Artist vs. symbol image table TB2 relates these artists "Dekoboko Sayaka," "Toba Outotsu," and so on with symbol image data Dx (1, 2, ..., N) symbolizing these artists. It should be noted that, for these symbol image data Dx, jacket symbol data related with past music data by these artists may be applied, for example.

Artist vs. symbol image table TB2 also relates artists with comparison character strings. For these comparison character strings, those which are high in the possibility of appearing in the artist names in the attribute information of the music data played by these artists are selected. In this case for example, "Dekoboko Sayaka" is selected as the character string corresponding to artist "Dekoboko Sayaka" and "Toba Outotsu" is selected as the character string corresponding to artist "Toba Outotsu."

Consequently, the CPU 3 of the reproducing apparatus 1 compares artist name "Dekoboko Sayaka" indicated in the attribute information of the in-reproduction music data with comparison character string "Dekoboko Sayaka" for example in artist vs. symbol image table TB2. If this comparison character string "Dekoboko Sayaka" is found included in artist name "Dekoboko Sayaka" in this attribute information, then the CPU 3 recognizes artist "Dekoboko Sayaka" corresponding to this comparison character string "Dekoboko Sayaka" as the artist who played the in-reproduction music data. Then, the CPU 3 of the reproducing apparatus 1 reads symbol image data Dx1 corresponding to recognized artist "Dekoboko Sayaka" from artist vs. symbol image table TB2 and displays a symbol image on the display block 10 on the basis of read symbol image data Dx1.

As described above, if jacket symbol data is not related with the in-reproduction music data being reproduced at that moment, the CPU 3 of the reproducing apparatus 1 may display a symbol image symbolizing the artist of this in-reproduction music data instead of displaying a jacket image. As a result, the reproducing apparatus 1 is capable of surely displaying a symbol image associated with the in-reproduction music data being reproduced at that time may be realized.

Figure 8:
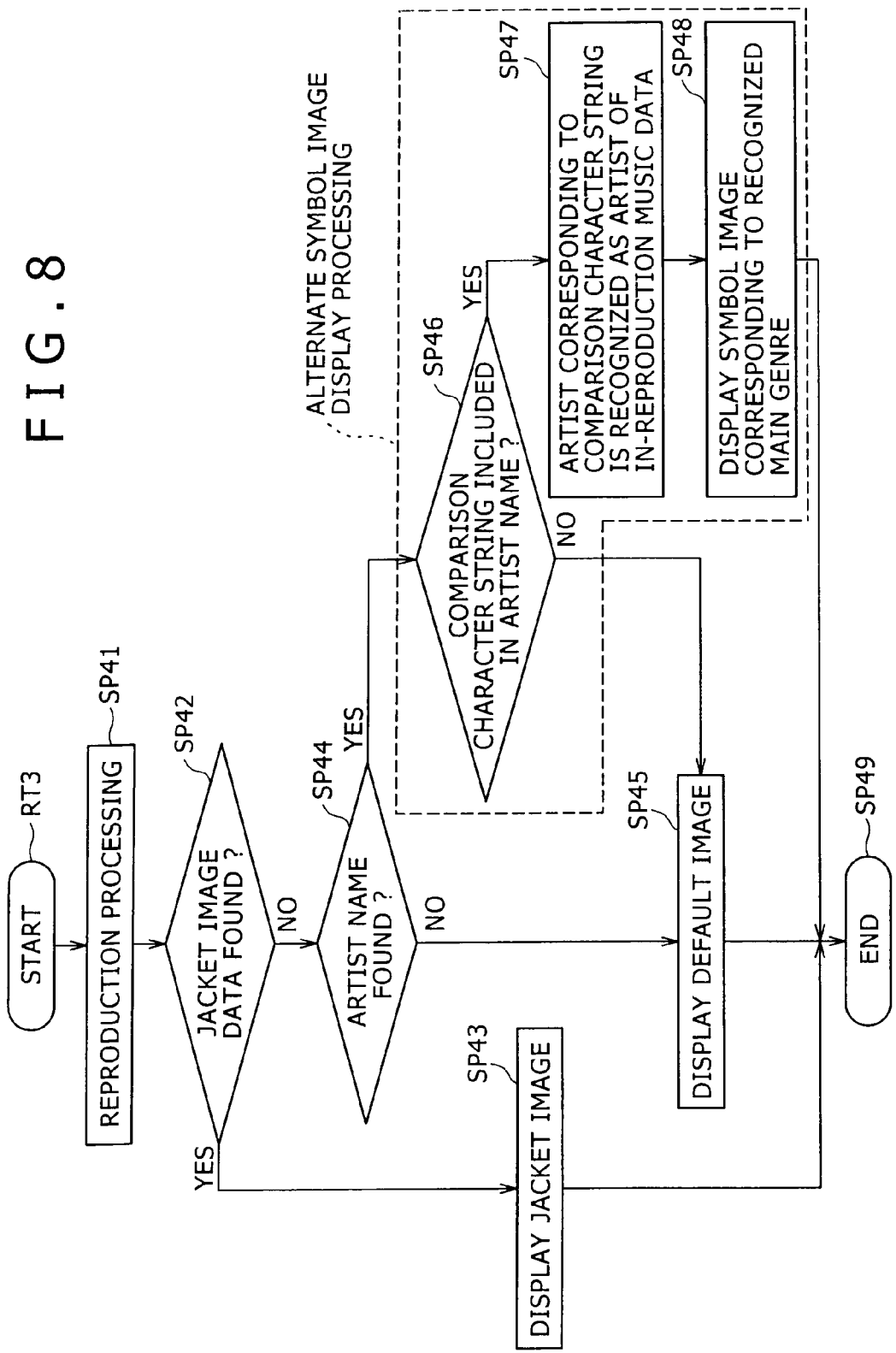
FIG. 8 is a flowchart indicative of an image display processing procedure.

The following describes image display processing procedure RT3 to be executed in the third embodiment with reference to the flowchart shown in FIG. 8.

When an operation for reproducing acquired music data is executed through the operation block 2 of the reproducing apparatus 1, the CPU 3 of the reproducing apparatus 1 accordingly goes to step SP41 to read the music data corresponding to the reproduction operation from the hard disc drive 6, thereby starting reproduction processing.

Next, the CPU 3 of the reproducing apparatus 1 goes to step SP42 to read attribute information related with in-reproduction music data being reproduced from the hard disc drive 6, thereby determining whether jacket image data is included in the read attribute information.

If the decision is YES in step SP42, it indicates that jacket image data is included in the attribute information of in-reproduction music data, upon which the CPU 3 of the reproducing apparatus 1 goes to step SP43. In step SP43, the CPU 3 of the reproducing apparatus 1 displays a jacket image on the display block 10 on the basis of the jacket image data included in the attribute information of the in-reproduction music data and then goes to step SP49 to end image display processing procedure RT3.

On the other hand, if the decision in step SP42 is NO, it indicates that the jacket image data is not included in the attribute information of the in-reproduction music data, upon which the CPU 3 of the reproducing apparatus 1 goes to step SP44. In step SP44, the CPU 3 of the reproducing apparatus 1 determines whether an artist name is included in the attribute information of the in-reproduction music data.

If the decision is NO in step SP44, it indicates that an artist name is not included in the attribute information of the in-reproduction music data, upon which the CPU 3 of the reproducing apparatus 1 goes to step SP45. In step S45, the CPU 3 of the reproducing apparatus 1 displays a default image on the display block 10 on the basis of predetermined default image data DxN defined in artist vs. symbol image table TB2 shown in FIG. 7 and then goes to step SP49 to end image display processing procedure RT3.

On the other hand, if the decision is YES in step SP44, it indicates that "Toba Outotsu" for example is included in the attribute information of the in-reproduction music data as an artist name, upon which the CPU 3 of the reproducing apparatus 1 goes to step SP46.

In step SP46, the CPU 3 of the reproducing apparatus 1 sequentially compares comparison character strings "Dekoboko Sayaka," "Toba Outotsu," and so on shown in artist vs. symbol image table TB2 with artist name "Toba Outotsu" in the attribute information of the in-reproduction music data. If comparison character string "Toba Outotsu" is found in artist name "Toba Outotsu" in the attribute information of the in-reproduction music data, for example, then the CPU 3 of the reproducing apparatus 1 goes to step SP47 to recognize artist "Toba Outotsu" corresponding to this comparison character string "Toba Outotsu" as the artist who played the in-reproduction music data.

Next, the CPU 3 of the reproducing apparatus 1 goes to step SP48, displays a symbol image on the display block 10 on the basis of symbol image data Dx2 corresponding to artist "Toba Outotsu" recognized in step SP47, and then goes to step SP49 to end image display processing procedure RT3.

It should be noted that, if none of comparison character strings "Dekoboko Sayaka," "Toba Outotsu," and so on is found included in the artist names in this attribute information as a result of the sequential comparison between comparison character strings shown in artist vs. symbol image table TB2 and the artist name in the attribute information of the in-reproduction music data, then the CPU 3 of the reproducing apparatus 1 goes to step SP45. In step SP45, the CPU 3 of the reproducing apparatus 1 displays a default image on the display block 10 on the basis of default image data DxN and goes to step SP49 to end image display processing procedure RT3.

As described above, if jacket image data indicative of an image of that in-reproduction music data is not related with the in-reproduction music data being reproduced at that moment, the reproducing apparatus 1 recognizes the artist who played that in-reproduction music data on the basis of the artist name information related with that in-reproduction music data, reads a symbol image data symbolizing the recognized artist from artist vs. symbol image table TB2, and displays the symbol image on the basis of the read symbol image data. Consequently, the reproducing apparatus 1 is able to surely display a symbol image associated with the in-reproduction music data being reproduced at that moment.

(4) Fourth Embodiment

A fourth embodiment of the invention is substantially the same in the configuration (FIG. 1) of the reproducing apparatus 1 as the above-mentioned first, second, and third embodiments. Also, the fourth embodiment is substantially the same as the second embodiment in the contents of attribute information related with music data acquired from music provision server SV or a CD (refer to FIG. 5). The fourth embodiment also uses artist vs. symbol image table TB2 shown in FIG. 7.

Figure 9:
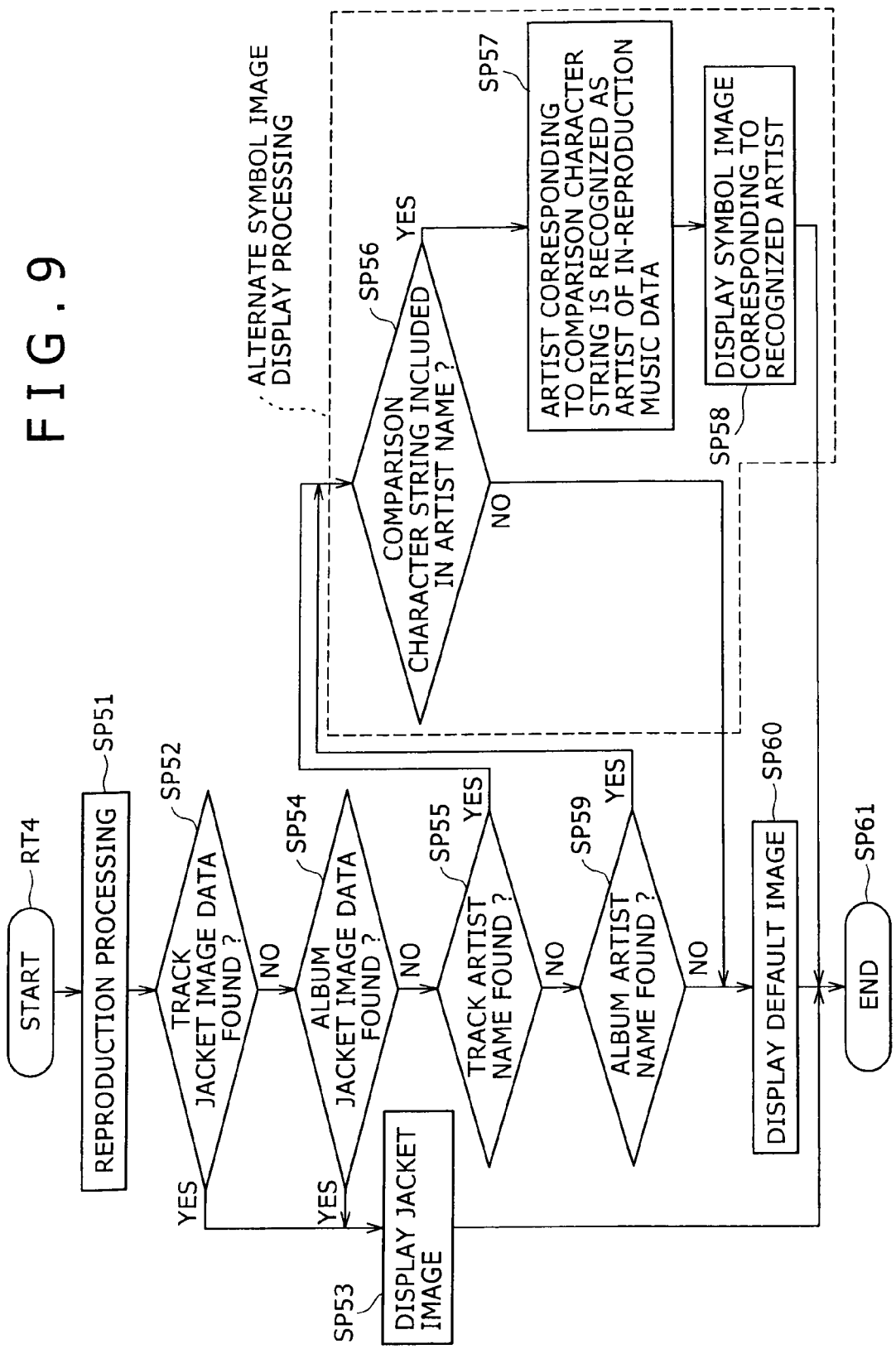
FIG. 9 is a flowchart indicative of another image display processing procedure.

The following describes image display processing procedure RT4 (FIG. 9) to be executed in the fourth embodiment.

When an operation for reproducing acquired music data is executed through the operation block 2 of the reproducing apparatus 1, the CPU 3 of the reproducing apparatus 1 accordingly goes to step SP51 to read the music data corresponding to the reproduction operation from the hard disc drive 6, thereby starting reproduction processing.

Next, the CPU 3 of the reproducing apparatus 1 goes to step SP52 to read attribute information of the in-reproduction music data being reproduced from the hard disc drive 6 to determine whether track jacket image data is included in the read attribute information.

If the decision in step SP52 is YES, it indicates that track jacket image data is included in the attribute information of the in-reproduction music data, upon which the CPU 3 of the reproducing apparatus 1 goes to step SP53. In step SP53, the CPU 3 of the reproducing apparatus 1 displays a track jacket image on the display block 10 on the basis of the track jacket image data included in the attribute information of the in-reproduction music data and then goes to step SP61 to end image display processing procedure RT4. On the other hand, if the decision is NO in step SP52, it indicates that track jacket image data is not included in the attribute information of the in-reproduction music data, upon which the CPU 3 of the reproducing apparatus 1 goes to step SP54.

In step SP54, the CPU 3 of the reproducing apparatus 1 determines whether album jacket image data is included in the attribute information related with the in-reproduction music data.

If the decision is YES in step SP54, it indicates that album jacket image data is included in the attribute information of the in-reproduction music data, upon which the CPU 3 of the reproducing apparatus 1 goes to step SP53. In step SP53, the CPU 3 of the reproducing apparatus 1 displays an album jacket image on the display block 10 on the basis of the album jacket image data included in the attribute information of the in-reproduction music data and then goes to step SP61 to end image display processing procedure RT4. On the other hand, if the decision is NO in step SP54, it indicates that album jacket image data is not included in the attribute information of the in-reproduction music data, upon which the CPU 3 of the reproducing apparatus 1 goes to step SP55.

In step SP55, the CPU 3 of the reproducing apparatus 1 determines whether a track artist name is included in the attribute information of in-reproduction music data.

If the decision is YES in step SP55, it indicates that "Toba Outotsu" for example is included in the attribute information of the in-reproduction music data as a track artist name, upon which the CPU 3 of the reproducing apparatus 1 goes to step SP56. In step SP56, the CPU 3 of the reproducing apparatus 1 sequentially compares comparison character strings "Dekoboko Sayaka," "Toba Outotsu," and so on shown in artist vs. symbol image table TB2 with track artist name "Toba Outotsu" in the attribute information of the in-reproduction music data. If comparison character string "Toba Outotsu" is found included in track artist name "Toba Outotsu," then the CPU 3 of the reproducing apparatus 1 goes to step SP57 to recognize artist "Toba Outotsu" corresponding to comparison character string "Toba Outotsu" as the artist who played the in-reproduction music data. Next, the CPU 3 of the reproducing apparatus 1 goes to step SP58 to display a symbol image on the display block 10 on the basis of symbol image data Dx2 corresponding to artist "Toba Outotsu" recognized in step SP57. Then, the CPU 3 of the reproducing apparatus 1 goes to step SP61 to end image display processing procedure RT4. It should be noted that, if none of comparison character strings "Dekoboko Sayaka," "Toba Outotsu," and so on is found included in this track artist name, then the CPU 3 of the reproducing apparatus 1 goes to step SP60. In step SP60, the CPU 3 of the reproducing apparatus 1 displays a default image on the display block 10 on the basis of default image data DxN and goes to step SP61 to end image display processing procedure RT4.

On the other hand, if the decision is NO in step SP55, it indicates that a track artist name is not included in the attribute information of the in-reproduction music data, upon which the CPU 3 of the reproducing apparatus 1 goes to step SP59.

In step SP59, the CPU 3 of the reproducing apparatus 1 determines whether an album artist name is included in the attribute information of the in-reproduction music data.

If the decision is YES in step SP59, it indicates that "Dekoboko Sayaka" for example is included in the attribute information of the in-reproduction music data as an album artist name, upon which the CPU 3 of the reproducing apparatus 1 goes to step SP56. In step SP56, the CPU 3 of the reproducing apparatus 1 sequentially compares comparison character strings "Dekoboko Sayaka," "Toba Outotsu," and so on shown in artist vs. symbol image table TB2 with album artist name "Dekoboko Sayaka" in the attribute information of the in-reproduction music data. If comparison character string "Dekoboko Sayaka" is found included in this album artist name "Dekoboko Sayaka" for example, then CPU 3 of the reproducing apparatus 1 goes to step SP57 to recognize artist "Dekoboko Sayaka" corresponding to this comparison character string "Dekoboko Sayaka" as the artist who played this in-reproduction music data. Next, the CPU 3 of the reproducing apparatus 1 goes to step SP58 to display a symbol image on the display block 10 on the basis of symbol image data Dx1 corresponding to artist "Dekoboko Sayaka" recognized in step SP57 and goes to step SP61 to end image display processing procedure RT4. It should be noted that, none of comparison character strings "Dekoboko Sayaka," "Toba Outotsu," and so on is found included in this album artist name, the CPU 3 of the reproducing apparatus 1 goes to step SP60 to display a default image on the display block 10 on the basis of default image data DxN and then goes to step SP61 to end image display processing procedure RT4.

On the other hand, if the decision is NO in step SP59, it indicates that an album artist name is not included in the attribute information of the in-reproduction music data, upon which the CPU 3 or the reproducing apparatus 1 goes to step SP60. In step SP60, the CPU 3 of the reproducing apparatus 1 displays a default image on the display block 10 on the basis of default image data DxN and then goes to step SP61 to end image display processing procedure RT4.

As described above, if track jacket image data indicative of an image of that in-reproduction music data and album jacket image data indicative of an image of an album to which that in-reproduction music data belongs are not related with the in-reproduction music data being reproduced at that moment, the reproducing apparatus 1 recognizes the artist who played that in-reproduction music data or the artist of an album to which that in-reproduction music data belongs on the basis of the artist name information related with that in-reproduction music data, reads a symbol image data symbolizing the recognized artist from artist vs. symbol image table TB2, and displays the symbol image on the basis of the read symbol image data. Consequently, the reproducing apparatus 1 is able to surely display a symbol image associated with the in-reproduction music data being reproduced at that moment.

(5) Fifth Embodiment

A fifth embodiment of the invention is substantially the same in the configuration (FIG. 1) of the reproducing apparatus 1 as the above-mentioned first, second, third, and fourth embodiments.

However, the fifth embodiments differs from the foregoing embodiments in that, every time music data stored in the hard disc drive 6 is reproduced, it is counted and reproduction count information indicative of the reproduction count is stored in the hard disc drive 6. The hard disc drive 6 of the reproducing apparatus 1 also stores a plurality of pieces of symbol image data corresponding to the reproduction count, such as symbol image data indicative of a high reproduction count and symbol image data indicative of a low reproduction count, for example.

Figure 10:
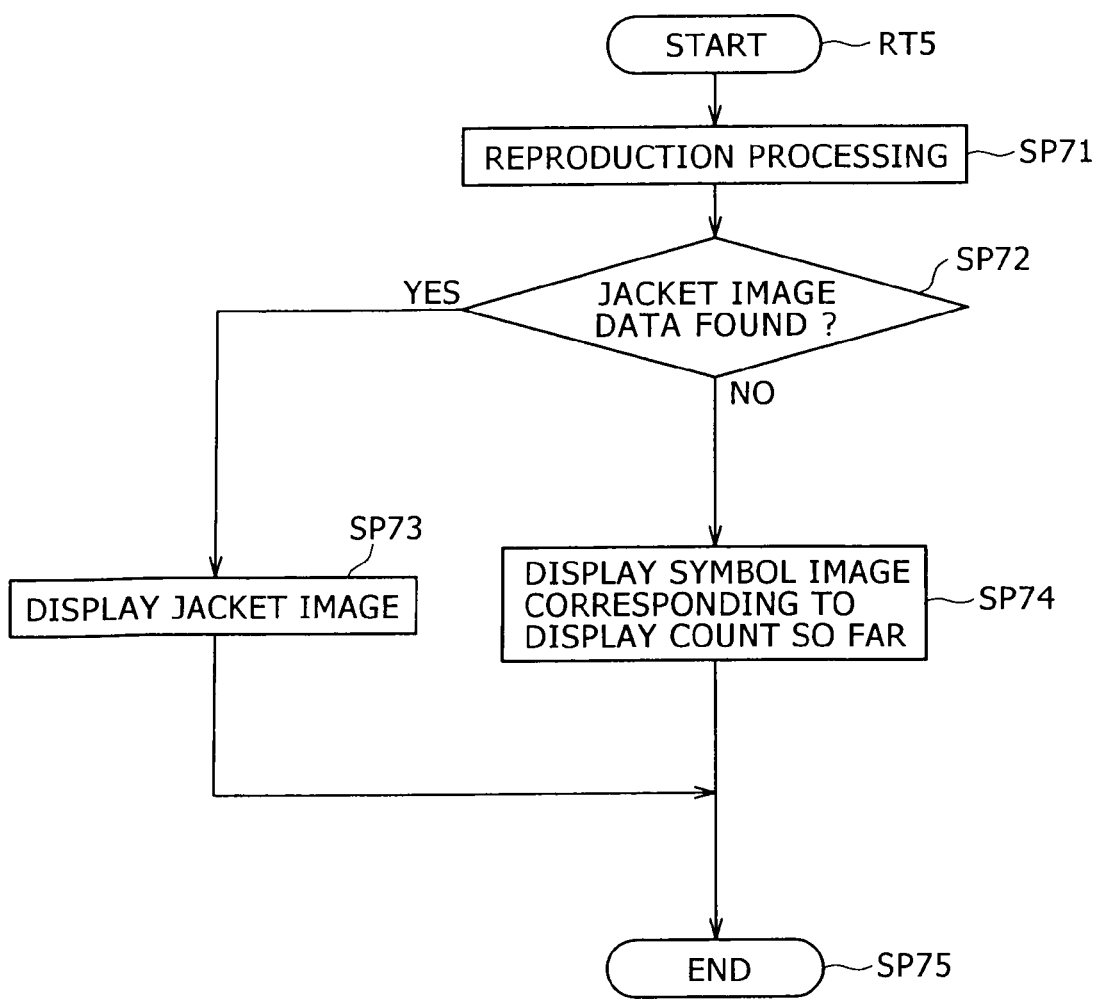
FIG. 10 is a flowchart indicative of still another image display processing procedure.

The following describes image display processing procedure RT5 (FIG. 10) to be executed in the fifth embodiment.

When an operation for reproducing acquired music data is executed through the operation block 2 of the reproducing apparatus 1, the CPU 3 of the reproducing apparatus 1 accordingly goes to step SP71 to read the music data corresponding to the reproduction operation from the hard disc drive 6, thereby starting reproduction processing.

Next, the CPU 3 of the reproducing apparatus 1 goes to step SP72 to read attribute information of the in-reproduction music data being reproduced from the hard disc drive 6 to determine whether jacket image data is included in the read attribute information.

If the decision is YES in step SP72, it indicates that jacket image data is included in the attribute information of the in-reproduction music data, upon which the CPU 3 of the reproducing apparatus 1 goes to step SP73. In step SP73, the CPU 3 of the reproducing apparatus 1 displays a jacket image on the basis of the jacket image data included in the attribute information of the in-reproduction music data and then goes to step SP75 to end image display processing procedure RT5.

On the other hand, if the decision is NO in step SP72, it indicates jacket image data is not included in the attribute information of the in-reproduction music data, upon which the CPU 3 of the reproducing apparatus 1 goes to step SP74.

In step SP74, the CPU 3 of the reproducing apparatus 1 reads reproduction count information corresponding to the in-reproduction music data from the hard disc drive 6 to recognize the reproduction count so far of that in-reproduction music data on the basis of the read reproduction count information, reads symbol image data corresponding to the recognized reproduction count from the hard disc drive 6, displays a symbol image on the display block 10 on the basis of the read symbol image data, and then goes to step SP75 to end image display processing procedure RT5.

Thus, if jacket image data is not related with the in-reproduction music data being reproduced at that moment, the CPU 3 of the reproducing apparatus 1 is able to display a symbol image symbolizing the reproduction frequency of that in-reproduction music data instead of displaying a jacket image. As a result, the reproducing apparatus 1 is capable to surely displaying a symbol image associated with the in-reproduction music data being reproduced at that moment may be realized.

(6) Sixth Embodiment

A sixth embodiment of the invention is substantially the same in the configuration (FIG. 1) of the reproducing apparatus 1 as the above-mentioned first, second, third, fourth, and fifth embodiments. The sixth embodiment is also substantially the same in the contents of the attribute information related with music data as the above-mentioned second embodiment for example (refer to FIG. 5).

Like the above-mentioned fifth embodiment, the CPU 3 of the reproducing apparatus 1 in the sixth embodiment counts the reproduction of each piece of music data stored in the hard disc drive 6 and stores the reproduction count information indicative of the obtained reproduction count into the hard disc drive 6. The hard disc drive 6 of the reproducing apparatus 1 also stores a plurality of pieces of symbol image data corresponding to the reproduction count, such as symbol image data indicative of a high reproduction count and symbol image data indicative of a low reproduction count, for example.

Figure 11:
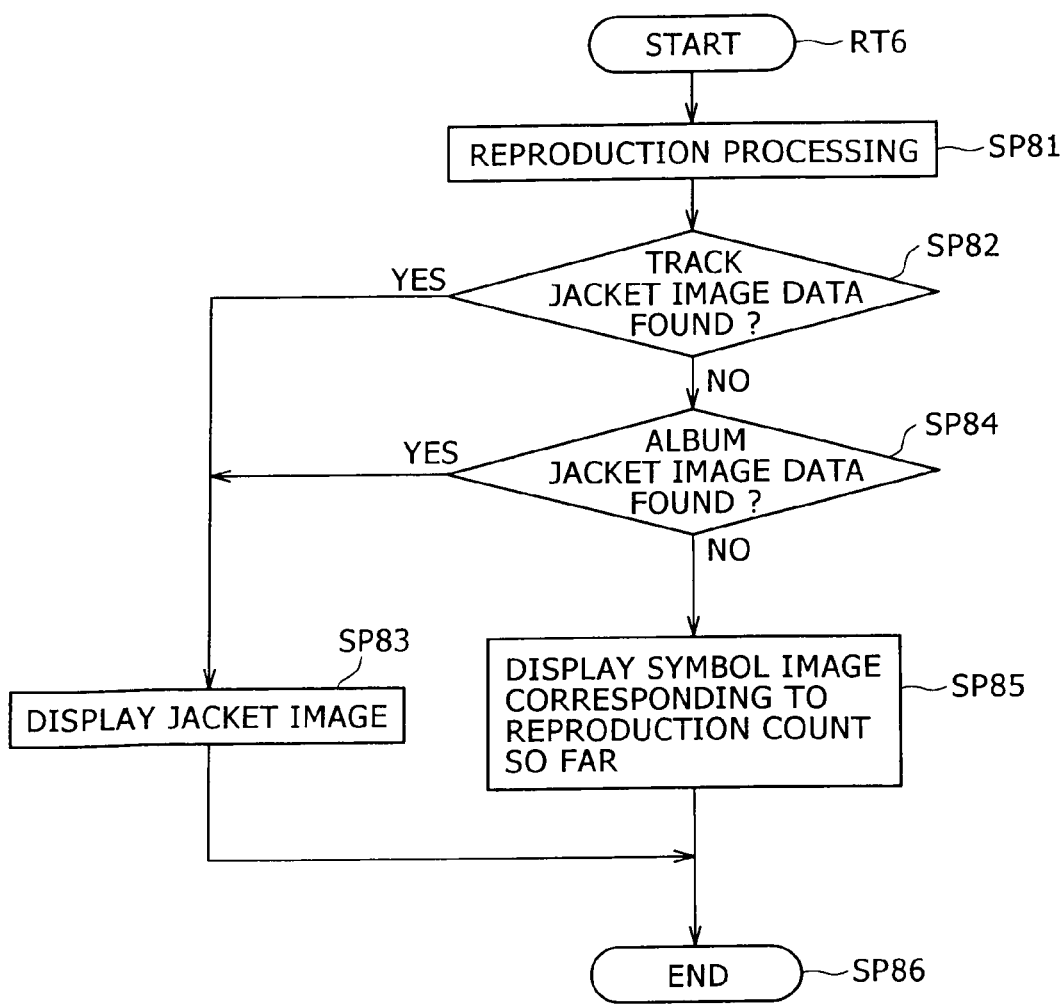
FIG. 11 is a flowchart indicative of yet another image display processing procedure.

The following describes image display processing procedure RT6 (FIG. 11) to be executed in the sixth embodiment.

When an operation for reproducing acquired music data is executed through the operation block 2 of the reproducing apparatus 1, the CPU 3 of the reproducing apparatus 1 accordingly goes to step SP81 to read the music data corresponding to the reproduction operation from the hard disc drive 6, thereby starting reproduction processing.

Next, the CPU 3 of the reproducing apparatus 1 goes to step SP82 to read attribute information of the in-reproduction music data being reproduced from the hard disc drive 6 to determine whether track jacket image data is included in the read attribute information.

If the decision is YES in step SP82, it indicates that track jacket image data is included in the attribute information of the in-reproduction music data, upon which the CPU 3 of the reproducing apparatus 1 goes to step SP83. In step SP83, the CPU 3 of the reproducing apparatus 1 displays a track jacket image on the display block 10 on the basis of the track jacket image data included in the attribute information of the in-reproduction music data and then goes to step SP86 to end image display processing procedure RT6.

On the other hand, if the decision is NO in step S82, it indicates that track jacket image data is not included in the attribute information of the in-reproduction music data, upon which the CPU 3 of the reproducing apparatus 1 goes to step SP84.

In step SP84, the CPU 3 of the reproducing apparatus 1 determines whether album jacket image data is included in the attribute information related with the in-reproduction music data.

If the decision is YES in step SP84, it indicates that album jacket image data is included in the attribute information of the in-reproduction music data, upon which the CPU 3 of the reproducing apparatus 1 goes to step SP83. In step SP83, the CPU 3 of the reproducing apparatus 1 displays an album jacket image on the display block 10 on the basis of the album jacket image data included in the attribute information of the in-reproduction music data and then goes to step SP86 to end image display processing procedure RT6.

On the other hand, if the decision is NO in step SP84, it indicates that album jacket image data is not included in the attribute information of the in-reproduction music data, upon which the CPU 3 of the reproducing apparatus 1 goes to step SP85.

In step SP85, the CPU 3 of the reproducing apparatus 1 reads reproduction count information corresponding to the in-reproduction music data to recognize the reproduction count so far of the in-reproduction music data on the basis of the read reproduction count information, reads symbol image data corresponding to the recognized reproduction count from the hard disc drive 6 to display a symbol image on the display block 10 on the basis of the read symbol image data, and goes to step SP86 to end image display processing procedure RT6.

Thus, if track jacket image data and album jacket image data are not related with the in-reproduction music data being reproduced at that moment, the CPU 3 of the reproducing apparatus 1 is able to display a symbol image symbolizing the reproduction frequency of that in-reproduction music data instead of displaying a track jacket image and an album jacket image. As a result, the reproducing apparatus 1 is capable to surely displaying a symbol image associated with the in-reproduction music data being reproduced at that moment may be realized.

(7) Other Embodiments

In the above-mentioned first and second embodiments, genre names in the attribute information of music data are subject to editing by user and therefore not fixed, so that main genre vs. symbol image table TB1 defines that character strings high in the possibility of appearing in genre names be related with symbol image data as comparison character strings, thereby comparing the defined comparison character strings with the genre name in the attribute information of in-reproduction music data. However, if the genre name in the attribute information of music data remains unchanged, it is also practicable to define that this genre name itself be related with symbol image data as a comparison character string in main genre vs. symbol image table TB1, thereby comparing the defined comparison character strings with the genre name in the attribute information of in-reproduction music data.

In the above-mentioned third and fourth embodiments, artist names in the attribute information of music data are subject to editing by user and therefore not fixed, so that artist vs. symbol image table TB2 defines that character strings high in the possibility of appearing in artist names be related with symbol image data as comparison character strings, thereby comparing the defined comparison character strings with the artist name in the attribute information of in-reproduction music data. However, if the artist name in the attribute information of music data remains unchanged, it is also practicable to define that this artist name itself be related with symbol image data as a comparison character string in artist vs. symbol image table TB2, thereby comparing the defined comparison character strings with the artist name in the attribute information of in-reproduction music data.

In the above-mentioned first through sixth embodiments, the application of music data for sounding music as content data has been described. The embodiments of the present invention are not limited to this application. For example, video data (movies and TV programs), still image data, game programs, text data (e.g. book data), and program data may also be applied as content data.

In the above-mentioned first through sixth embodiments, jacket images for example that are still images are applied as symbol images visually indicative of images associated with music data. It is also practicable to apply various other kinds of images such as moving pictures (or video), icon images, and so on.

In the above-mentioned first through sixth embodiments, the reproducing apparatus 1 having a recording capability of recording music data acquired from music provision server SV and CD to the hard disc drive 6 and a reproducing capability of reproducing music data from the hard disc drive 6 is applied to a recording/reproducing apparatus. It is also practicable to apply various other configurations for the reproducing apparatus 1.

In the above-mentioned first through sixth embodiments, the CPU 3 adapted to execute various processing operations by expanding programs stored in the ROM 11 into the RAM 12 is used as a recording means for recording content data to recording media (or the hard disc drive 6). It is also practicable to apply various other configurations. For example, each of components recited in claims hereto may be implemented with a separate hardware block.

In the above-mentioned first through sixth embodiments, the hard disc drive 6 for storing main genre vs. symbol image table TB1 and artist vs. symbol image table TB2 is applied as an image data storage device for storing image data in correspondence with particular attribute information. It is also practicable to apply various other configurations.

In the above-mentioned first through sixth embodiment, the CPU 3 of the reproducing apparatus 1 is applied as a reproducing means for reproducing content data from recording media, attribute information detection means for detecting attribute information related with content data if no image data (or jacket image data) is related with content data, image data detection means for detecting, from the image data storage means, image data (or symbol image data) related with attribute information (or sub genre information, artist name information, and reproduction count information) detected by the attribute information detection means, and control means for controlling such that image data detected by the image data detection means during the reproduction of content data by the reproduction means be outputted (or displayed). It is also practicable to apply various other configurations. For example, if a particular piece of content data is selected by user through the operation block 2, the image data thereof may be outputted. At this moment, that content data may not be reproduced. When the reproduction of content data has ended and the reproducing operation ends, the output of the image data corresponding to that content data may be continued.

In the above-mentioned first through sixth embodiments, the CPU 3 of the reproducing apparatus 1 executes the above-mentioned image display processing procedures RT1 through RT6 in software approach in accordance with programs stored in the hard disc drive 6 and so on. It is also practicable to apply hardware circuits for executing image display processing procedures RT1 through RT6 to the reproducing apparatus 1, thereby realizing these procedures in hardware approach.

While preferred embodiments of the present invention have been described using specific terms, such description is for illustrative purpose only, and it is to be understood that changes and variations may be made without departing from the spirit or scope of the following claims.

What is claimed is:

1. An information processing apparatus, comprising:
    recording means for recording content data on a recording medium;
    reproducing means for reproducing the content data recorded on the recording medium;
    image data storage means for storing image data corresponding to a number of reproduction times;
    determining means for determining whether predetermined jacket image data is associated with the content data;
    number-of-reproduction-times detecting means for detecting a number of reproduction times of the content data that is reproduced by the reproducing means, based on a determination by the determining means that the content data is not associated with the predetermined jacket image data;
    image data detecting means for detecting the image data corresponding to the number of reproduction times detected by the number-of-reproduction-times detecting means from the image data storage means; and
    control means for controlling the image data detected by the image data detecting means to be output while reproducing the content data by the reproducing means.

2. A method of an information processing apparatus, comprising:
    reproducing content data recorded on a recording medium;
    determining whether predetermined jacket image data is associated with the content data;
    detecting a number of reproduction times of the content data, based on a determination in the determining step that the content data is not associated with the predetermined jacket image data;
    detecting, by the information processing apparatus, image data corresponding to the number of reproduction times detected by the detecting the number of reproduction times step from the recording medium; and
    controlling, by a processor of the information processing apparatus, the image data detected by the detecting image data step to be output while reproducing the content data by the reproducing step.

3. A non-transitory computer-readable storage medium having a program, which when executed by a computer, causes the computer to perform a method comprising:
    reproducing content data recorded on a recording medium;
    determining whether predetermined jacket image data is associated with the content data;
    detecting a number of reproduction times of the content data, based on a determination in the determining step that the content data is not associated with the predetermined jacket image data;
    detecting image data corresponding to the number of reproduction times detected by the detecting the number of reproduction times step from the recording medium; and
    controlling the image data detected by the detecting image data step to be output while reproducing the content data by the reproducing step.

4. An information processing apparatus, comprising:
reproducing means for reproducing content data recorded on a recording medium;
recording means for recording multiple text and image data corresponding to each of the multiple text;
determining means for determining whether predetermined jacket image data is associated with the content data;
attribute information detecting means for detecting an editable second text that is attribute information of the content data based on a determination by the determining means that the content data is not associated with the predetermined jacket image data;
image data detecting means for detecting the image data corresponding to text obtained as a result of a comparison between the second text detected by the attribute information detecting means and the multiple text recorded by the recording means in a predetermined priority; and
control means for controlling the image data detected by the image data detecting means to be output while reproducing the content data by the reproducing means.

5. The information processing apparatus, according to claim 4, wherein the attribute information of the content data is genre information, and the second text is a genre name.

6. The information processing apparatus, according to claim 4, wherein the attribute information of the content data is artist information, and the second text is an artist name.

7. The information processing apparatus, according to claim 4, wherein the predetermined priority is defined in advance to correspond to the multiple text and the image data.

8. A method of an information processing apparatus comprising:
reproducing content data recorded on a recording medium;
determining whether predetermined jacket image data is associated with the content data;
detecting an editable second text that is attribute information of the content data based on a determination in the determining step that the content data is not associated with the predetermined jacket image data;
detecting, by the information processing apparatus, image data corresponding to text obtained as a result of a comparison between the second text detected by an attribute information detecting unit and multiple text recorded by a recording unit in a predetermined priority, among image data corresponding to each of the multiple text stored by the recording unit; and
controlling the image data detected by the detecting image data step to be output while reproducing the content data by the reproducing step.

9. A non-transitory computer-readable storage medium having a program, which when executed by a computer, causes the computer to perform a method, comprising:
reproducing content data recorded on a recording medium;
determining whether predetermined jacket image data is associated with the content data;
detecting an editable second text that is attribute information of the content data based on a determination in the determining step that the content data is not associated with the predetermined jacket image data;
detecting image data corresponding to text obtained as a result of a comparison between the second text detected by a attribute information detecting unit and multiple text recorded by a recording unit in a predetermined priority, among image data corresponding to each of the multiple text stored by the recording unit; and
controlling the image data detected by the detecting image data step to be output while reproducing the content data by the reproducing step.

10. An information processing apparatus comprising:
a recording unit configured to record content data on a recording medium;
a reproducing unit configured to reproduce the content data recorded on the recording medium;
a determining unit configured to determine whether predetermined jacket image data is associated with the content data;
a memory configured to store image data corresponding to a number of reproduction times;
a number-of-reproduction-times detecting unit configured to detect a number of reproduction times of the content data that is reproduced by the reproducing unit, based on a determination by the determining unit that the content data is not associated with the predetermined jacket image data;
an image data detecting unit configured to detect the image data corresponding to the number of reproduction times detected by the number-of-reproduction-times detecting unit from the memory; and
a control unit configured to control the image data detected by the image data detecting unit to be output while reproducing the content data by the reproducing unit.

11. The information processing apparatus, according to claim 10, wherein the determining unit is configured to determine whether predetermined jacket image data is associated with the content data based on whether the predetermined jacket image data is included in attribute information stored in the memory and in association with the content data.

12. The information processing apparatus, according to claim 11, wherein the attribute information includes at least two or more of music title, album name, artist name, lyrics, genre, and the predetermined jacket image data.

13. The information processing apparatus, according to claim 10, wherein the control unit is configured to
control the predetermined image data to be output while reproducing the content data by the reproducing unit when the determining unit determines that the predetermined jacket image data is associated with the content data, and
control the image data detected by the image data detecting unit to be output while reproducing the content data by the reproducing unit when the determining unit determines that the content data is not associated with the predetermined jacket image data.

14. An information processing apparatus comprising:
a reproducing unit configured to reproduce content data recorded on a recording medium;
a recording unit configured to record multiple text and image data corresponding to each of the multiple text;
a determining unit configured to determine whether predetermined jacket image data is associated with the content data;
an attribute information detecting unit configured to detect an editable second text that is attribute information of the content data based on a determination by the determining unit that the content data is not associated with the predetermined jacket image data;
an image data detecting unit configured to detect the image data corresponding to text obtained as a result of a comparison between the second text detected by the attribute information detecting unit and the multiple text recorded by the recording unit in a predetermined priority; and
a processor configured to control the image data detected by the image data detecting unit to be output while reproducing the content data by the reproducing unit.

* * * * *